United States Patent
Whattam

(10) Patent No.: US 10,950,116 B2
(45) Date of Patent: Mar. 16, 2021

(54) INTEGRATED ALERT SYSTEM

(76) Inventor: Jeff Whattam, Richland, WA (US)

( * ) Notice: Subject to any disclaimer, the term of this patent is extended or adjusted under 35 U.S.C. 154(b) by 1040 days.

(21) Appl. No.: 11/993,182

(22) PCT Filed: Jun. 20, 2006

(86) PCT No.: PCT/US2006/023973
§ 371 (c)(1),
(2), (4) Date: Jul. 19, 2010

(87) PCT Pub. No.: WO2007/002083
PCT Pub. Date: Jan. 4, 2007

(65) Prior Publication Data
US 2010/0281405 A1  Nov. 4, 2010

Related U.S. Application Data

(60) Provisional application No. 60/692,764, filed on Jun. 22, 2005.

(51) Int. Cl.
*G08B 25/00* (2006.01)
*G06N 5/02* (2006.01)

(52) U.S. Cl.
CPC ............ *G08B 25/00* (2013.01); *G06N 5/025* (2013.01)

(58) Field of Classification Search
CPC ... G06F 19/3418; G08B 21/02; G08B 27/001; G08B 25/00; G06N 5/025

(Continued)

(56) References Cited

U.S. PATENT DOCUMENTS

| 4,141,006 A | 2/1979 | Braxton |
| 4,375,637 A * | 3/1983 | Desjardins .................... 340/517 |

(Continued)

FOREIGN PATENT DOCUMENTS

| CA | 2453709 | 6/2005 |
| WO | 2006034246 | 3/2006 |

OTHER PUBLICATIONS

Hunter et al. , "Applications of networking capabilities to assist in situational awareness," Proceedings of the 2004 IEEE Systems and Information Engineering Design Symposium, pp. 25-32, Apr. 16, 2004.*

(Continued)

*Primary Examiner* — Jennifer N To
*Assistant Examiner* — Reji Kartholy
(74) *Attorney, Agent, or Firm* — Umberg Zipser LLP

(57) ABSTRACT

Alert systems provide increased functionality and interactive operation by use of subsystems (240, 250, 260) that are coupled between the GUI/rules engine (220, 210) and the alert devices (248, 258, 268), wherein the subsystems (240, 250, 260,) provide for bidirectional flow of information. Therefore, in one aspect, the GUI (220) displays functional and operational parameters of associated alert devices (248, 258, 268) in real time and thus allows an administrator rule building without knowledge of installed devices. In another aspect, as the alert system displays and controls all associated alert devices (248, 258, 268) via the GUI (220), contemplated alert systems allows activation of multiple and distinct alert devices (248, 258, 268) using a single user interface. Viewed from another perspective, contingency and area specific alerts can be triggered from the GUI (220) using only point and click action.

15 Claims, 3 Drawing Sheets

(58) Field of Classification Search
USPC .............................. 715/764; 706/45, 46, 47
See application file for complete search history.

(56) References Cited

U.S. PATENT DOCUMENTS

| | | | | |
|---|---|---|---|---|
| 5,113,427 | A * | 5/1992 | Ryoichi | B60R 25/086 180/167 |
| 5,493,692 | A * | 2/1996 | Theimer et al. | 709/206 |
| 5,758,088 | A * | 5/1998 | Bezaire et al. | 709/232 |
| 5,815,417 | A * | 9/1998 | Orr et al. | 703/5 |
| 5,912,947 | A * | 6/1999 | Langsenkamp et al. | 379/69 |
| 6,078,649 | A * | 6/2000 | Small et al. | 379/39 |
| 6,496,110 | B2 * | 12/2002 | Peterson et al. | 340/522 |
| 6,574,561 | B2 * | 6/2003 | Alexander et al. | 702/5 |
| 6,661,340 | B1 | 12/2003 | Saylor et al. | |
| 6,690,274 | B1 * | 2/2004 | Bristol | 340/506 |
| 6,748,343 | B2 * | 6/2004 | Alexander et al. | 702/188 |
| 6,804,656 | B1 * | 10/2004 | Rosenfeld et al. | 705/3 |
| 6,809,642 | B1 * | 10/2004 | Brenner | 340/506 |
| 6,816,878 | B1 * | 11/2004 | Zimmers et al. | 709/200 |
| 7,042,345 | B2 * | 5/2006 | Ellis | 340/436 |
| 7,130,389 | B1 * | 10/2006 | Rodkey et al. | 379/88.12 |
| 7,184,744 | B1 * | 2/2007 | Schnabel | 455/404.2 |
| 7,194,249 | B2 * | 3/2007 | Phillips et al. | 455/404.1 |
| 7,233,781 | B2 * | 6/2007 | Hunter et al. | 455/404.1 |
| 7,277,018 | B2 * | 10/2007 | Reyes et al. | 340/573.1 |
| 7,409,428 | B1 * | 8/2008 | Brabec et al. | 709/206 |
| 7,460,020 | B2 * | 12/2008 | Reyes et al. | 340/573.1 |
| 7,557,702 | B2 * | 7/2009 | Eryurek et al. | 340/511 |
| 7,592,912 | B2 * | 9/2009 | Hasek et al. | 340/539.16 |
| 7,602,277 | B1 * | 10/2009 | Daly et al. | 340/438 |
| 7,603,432 | B2 * | 10/2009 | Warner | 709/217 |
| 7,616,942 | B2 * | 11/2009 | Karl et al. | 455/404.1 |
| 7,617,287 | B2 * | 11/2009 | Vella et al. | 709/207 |
| 7,675,423 | B2 * | 3/2010 | Boling et al. | 340/573.1 |
| 7,679,505 | B1 * | 3/2010 | Vallaire | 340/539.1 |
| 7,679,506 | B1 * | 3/2010 | Vallaire | 340/539.1 |
| 7,872,573 | B2 * | 1/2011 | Lamb | 340/539.1 |
| 7,873,344 | B2 * | 1/2011 | Bowser et al. | 455/404.1 |
| 7,907,930 | B2 * | 3/2011 | Grevers, Jr. | 455/404.1 |
| 7,995,998 | B2 * | 8/2011 | Wright et al. | 455/414.3 |
| 8,024,330 | B1 * | 9/2011 | Franco et al. | 707/724 |
| 8,180,318 | B1 * | 5/2012 | Daly et al. | 455/404.2 |
| 2001/0026221 | A1 | 10/2001 | Toyota | |
| 2002/0024424 | A1 * | 2/2002 | Burns et al. | 340/310.01 |
| 2002/0093527 | A1 | 7/2002 | Sherlock et al. | |
| 2002/0171546 | A1 | 11/2002 | Evans et al. | |
| 2002/0188522 | A1 * | 12/2002 | McCall et al. | 705/26 |
| 2003/0028536 | A1 * | 2/2003 | Singh et al. | 707/10 |
| 2003/0041238 | A1 * | 2/2003 | French et al. | 713/153 |
| 2003/0125998 | A1 * | 7/2003 | McKenney et al. | 705/7 |
| 2003/0207670 | A1 * | 11/2003 | Fernandez et al. | 455/12.1 |
| 2004/0070515 | A1 * | 4/2004 | Burkley et al. | 340/825.49 |
| 2004/0152493 | A1 * | 8/2004 | Phillips et al. | 455/567 |
| 2005/0030977 | A1 * | 2/2005 | Casey et al. | 370/485 |
| 2005/0085257 | A1 * | 4/2005 | Laird et al. | 455/550.1 |
| 2005/0162267 | A1 * | 7/2005 | Khandelwal et al. | 340/506 |
| 2005/0195069 | A1 * | 9/2005 | Dunand | B60R 25/043 340/5.61 |
| 2005/0197962 | A1 * | 9/2005 | Critchfield | G06Q 50/26 705/53 |
| 2005/0242944 | A1 * | 11/2005 | Bankert et al. | 340/531 |
| 2005/0264412 | A1 | 12/2005 | Levesque et al. | |
| 2006/0022819 | A1 * | 2/2006 | Vincent Granny et al. | 340/539.17 |
| 2006/0047543 | A1 * | 3/2006 | Moses | 705/7 |
| 2006/0287872 | A1 * | 12/2006 | Simrell | 705/1 |
| 2007/0004377 | A1 * | 1/2007 | Medford et al. | 455/404.1 |
| 2007/0008104 | A1 * | 1/2007 | McBain | G08B 23/00 340/517 |
| 2007/0044539 | A1 * | 3/2007 | Sabol et al. | 73/19.01 |
| 2007/0210910 | A1 * | 9/2007 | Norstrom et al. | 340/506 |
| 2007/0275690 | A1 * | 11/2007 | Hunter et al. | 455/404.2 |
| 2008/0059998 | A1 * | 3/2008 | McClenny et al. | 725/33 |
| 2008/0274761 | A1 * | 11/2008 | Block et al. | 455/517 |
| 2009/0031340 | A1 * | 1/2009 | Modi et al. | 725/33 |
| 2009/0128359 | A1 * | 5/2009 | Whattam | 340/825.49 |
| 2009/0131021 | A1 * | 5/2009 | Vogedes et al. | 455/412.1 |
| 2009/0134982 | A1 * | 5/2009 | Robertson et al. | 340/326 |
| 2010/0001858 | A1 * | 1/2010 | Daly et al. | 340/540 |
| 2010/0015943 | A1 * | 1/2010 | Karl et al. | 455/404.1 |
| 2010/0088718 | A1 * | 4/2010 | Hasek et al. | 725/33 |
| 2010/0274616 | A1 * | 10/2010 | Grace et al. | 705/9 |
| 2010/0313148 | A1 * | 12/2010 | Hochendoner et al. | 715/759 |
| 2010/0328093 | A1 * | 12/2010 | Robinson et al. | 340/825.49 |
| 2011/0234394 | A1 * | 9/2011 | Whattam | 340/539.11 |
| 2012/0227068 | A1 * | 9/2012 | Ostermeier et al. | 725/33 |
| 2013/0079034 | A1 * | 3/2013 | Taylor et al. | 455/456.2 |

OTHER PUBLICATIONS

Hernandez et al., "Knowledge-based models for emergency management systems", Expert Systems with Applications, vol. 20, n. 2, pp. 173-186, Feb. 2001.*
Gadomski et al., "Towards intelligent decision support systems for emergency managers: the IDA approach", Int. J. Risk Assessment and Management, vol. 2, Nos. 3-4, pp. 224-242, 2001.*
"WAG UAProf", Wireless Application Protocol (WAP) User Agent Profile (UAProf) specification, WAP-248-UAPROF-20011020-a, Version Oct. 20, 2001, 2001.*
Backx, "System Modal Dialogs", http://lesstif.sourceforge.net/InsideLessTif/node22.html, Dec. 2000.*
Botterell, Common Alerting Protocol, v. 1.0, OASIS Standard 200402, oasis-200402-cap-core-1.0, http://www.oasis-open.org/committees/emergency, Mar. 2004.*
"Design and O&M: Mass Notification Systems", Unified Facilities Criteria (UFC), UFC 4-021-01, Dec. 18, 2002.*
Moore, "Emergency Communications: The Emergency Alert System (EAS) and All-Hazard Warnings", CRS Report for Congress, Nov. 12, 2004.*
"W.A.R.N. Wide Area Rapid Notification Product Overview and Specifications", http://warncalling.com/overview.html, as stored at www.archive.org/web/20040402044042/http://warncalling.com/overview.html on Apr. 2, 2004.*
"Implementing the Vision", Partnership for Public Warning, 2003.*
"A National Strategy for Integrated Public Warning Policy and Capability", PPW Report Jan. 2003, Partnership for Public Warning, Feb. 2003.*
"Creating a National All-Hazard Warning Capability: Forging a National Consensus", Partnership for Public Warning, 2004.*
"Improving the Effectiveness of the Homeland Security Advisory System", Partnership for Public Warning, Jul. 2002.*
"Developing a Unified All-Hazard Public Warning System", PPW Report Feb. 2002, Partnership for Public Warning, Nov. 2002.*
Arabshian et al., "SIP-based Emergency Notification System", Oct. 2001.*
Arabshian et al., "A Generic Event Notification System Using XML and SIP", 2003.*
Botterell, "An Advanced EAS Relay Network Using the Common Alerting Protocol (CAP)", Sep. 11, 2003.*
NFPA Journal, National Fire Protection Association, v. 97, n. 3, pp. 1-144 May/Jun. 2003.*
Syniverse Technologies, "Syniverse Launches Alert Notification Messaging System", press release, Mar. 22, 2004.*
UCSD Health Sciences, "UCSD, VA, and CAL-(IT)2 Wireless Technology to Enhance Mass Casualty Treatment in Disasters", press release, Oct. 23, 2003.*
WiredRed, "WiredRed Software Announces Real-Time Communications Alert System", Oct. 22, 2001.*
Chen et al., Design and Implementation of a Real-Time Clinical Alerting System for Intensive Care Unit, Telemedicine Lab, Institute of Health Informatics and Decision Making, National Yang-Ming University, Taipei, Taiwan, et al., 2002 Annual Symposium Proceedings, pp. 131-135.

* cited by examiner

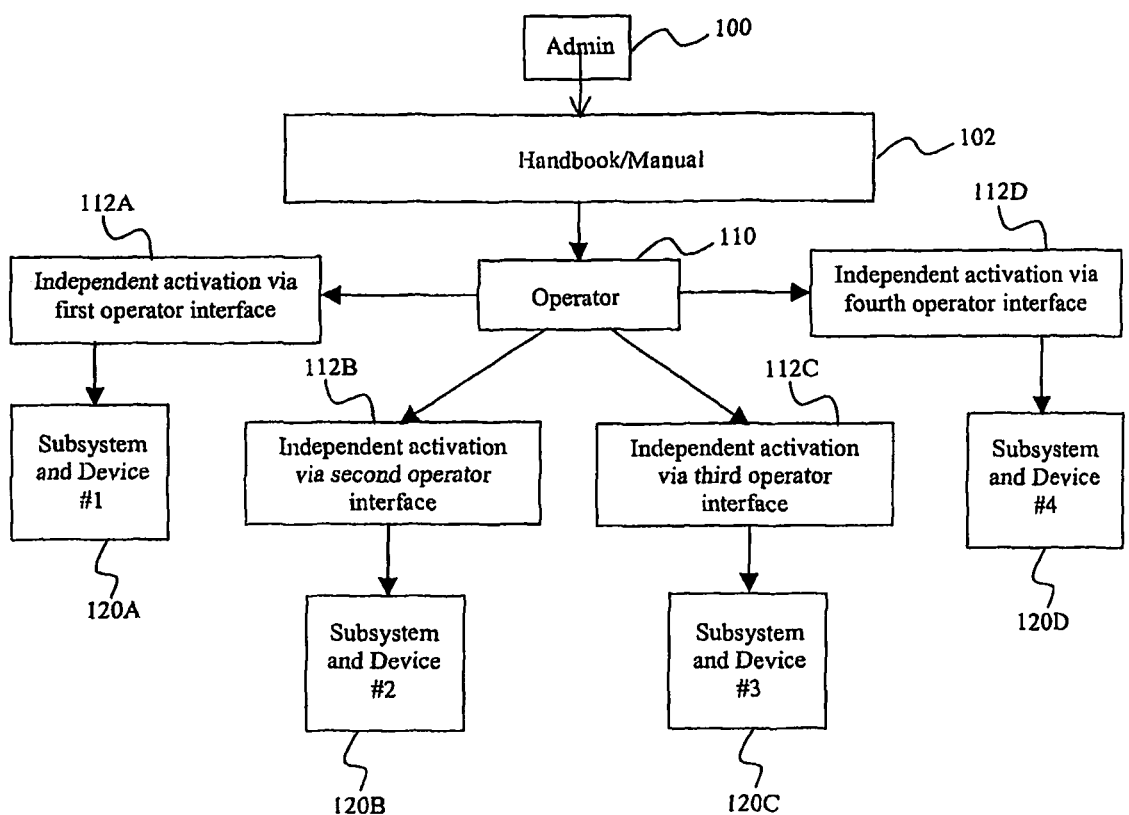
Prior Art Figure 1A
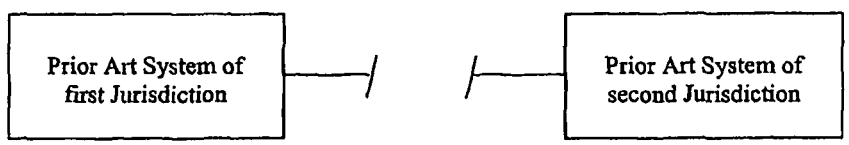
Prior Art Figure 1B

INTEGRATED ALERT SYSTEM

This application claims priority to U.S. provisional patent application with the Ser. No. 60/692,764, which was filed Jun. 21, 2005.

FIELD OF THE INVENTION

The field of the invention is alert systems and methods therefor.

BACKGROUND OF THE INVENTION

Currently known alert systems typically include various subsystems to provide effective notification to first responders and a potentially affected population in an area hit by a disaster or other contingency. For example, where an alert system is in the same jurisdiction as a chemical plant processing hazardous materials, subsystems may include pager systems to alert one or more hazmat teams, physicians, hospitals, public sirens to warn the potentially affected population, highway display boards to reroute traffic, and control circuitry that shuts off air intake ducts in shopping malls and other public buildings.

Proper selection and coordination of alert activities is often problematic, especially where the central operator is inexperienced and/or where the emergency fails to conform to a previously established pattern. To alleviate such difficulties, contingency plans can be designed that allow for at least some degree of flexibility. However, even in a relatively sophisticated contingency plan, proper subsystems need to be separately and individually identified, accessed, and operated by the central operator as each of the subsystems typically has individual modes and routes of activation. A typical known alert system is depicted in Prior Art FIG. 1A. Here, a contingency plan (typically handbook or manual) is consulted by an operator that then interacts via several and distinct operator interfaces (e.g., siren network using switchboard, pager notification using telephone, etc.) to provide notification. Cleary, such system is time-consuming, error-prone, and will typically be delayed or even fail where two or more types of notification require the same communication channel (e.g., where paging and fax transmission of an action plan employs the same dialer).

Upon notification of a particular incident, the operator enters appropriate information into the computer and is prompted by the rules engine to take certain specific actions (most typically, an administrator has oversight over the implementation and/or design of the rules engine). For example, the operator will be prompted to activate the public siren subsystem, then to page the first responders using specific text messages, and then to display warnings and reroute traffic using the highway display board system. While such notification systems provide at least some guidance to the operator, several difficulties remain.

Among other things, currently known systems require multiple independent activation activities for the respective subsystems. Moreover, and especially where a component of a subsystem is inoperable or otherwise unavailable, the operator typically needs to request alternative routes or modes from the rules engine (if available at all), which is time consuming and error prone. Moreover, system upgrades to add or modify a subsystem will require a modification of the rules engine, which needs to be implemented as soon as possible, or the subsystem will perform in an undesirable manner. Still further, where a subsequent contingency evolved from the first emergency (e.g., earthquake followed by fire, followed by aftershocks that block roadways), coordination and activation of subsystems quickly becomes a daunting task using currently known alert systems.

Such problems are typically, compounded where the contingency event spans across multiple jurisdictions. In such an event, it can be almost expected that the subsystems of the individual jurisdictions will not be responsive to an activation attempt from another jurisdiction. Moreover, even if the subsystems would be compatible to at least some degree, rules engines in different jurisdictions will often reflect economic, geographic, and political characteristics of the particular jurisdiction and therefore dictate inconsistent use of subsystems that are available. As a consequence, synergistic interaction among different jurisdictions is often not achieved as depicted in Prior Art FIG. 1B.

Therefore, while numerous configurations and methods for alert systems are known in the art, all or almost all of them suffer from one or more disadvantages. Consequently, there is still a need to provide improved configurations and methods for alert systems, and especially integrated alert systems that facilitate activation and coordination of multiple subsystems.

SUMMARY OF THE INVENTION

The present invention is directed to alert systems and methods therefor in which a GUI provides the interactive platform for both rule building and modification as well as for triggering an alert in which multiple distinct alert devices are involved. Most preferably, contemplated alert systems will include a subsystem for each alert device, wherein the subsystem is configured to provide information in a bidirectional manner (e.g., to and from the rules engine and/or GUI). Among other advantages, use of such subsystems allows integration of multiple and distinct alert devices into a single GUI that provides real time information (e.g., on type, status, and operational capability) of all alert devices coupled to the rules engine and/or GUI.

In one aspect of the inventive subject matter, an alert system may include a rules engine informationally coupled to a first subsystem and a second subsystem, wherein first and second subsystems are coupled to first and second alert devices, respectively. A GUI is informationally coupled to the rules engine, wherein the GUI is configured to display an operational parameter and/or an operational status of at least one of the first and second alert devices, wherein the subsystem is configured to provide at least one of the operational parameter and the operational status to at least of the rules engine and the GUI, and wherein at least one of the rules engine and the GUI are configured to allow building of a rule using at least one of the displayed operational parameter and operational status.

In such systems, it is generally preferred that the first and second subsystems comprise a first and second device adapter and a first and second channel adapter, respectively, and the that first and second subsystems are configured such that the first device adapter controls the second channel adapter if the second device adapter malfunctions or is unavailable. Still further, it is contemplated that the first subsystem has a plurality of redundant first device adapters and a plurality of redundant first channel adapters. Where appropriate, a scheduler may be included that is configured to schedule activation of the first and second alert devices upon activation of the first and second alert devices via the first channel adapter to avoid alert activation conflicts and/or streamline multiple activations through a single channel.

Additionally, or alternatively, it is contemplated that at least one of the rules engine, the first subsystem, and the second subsystems are configured to automatically provide an updated displayed operational parameter and/or an updated operational status upon modification or exchange of the first alert device. Furthermore, the GUI is preferably configured to allow for operator input of a contingency and to further allow selection of a defined area in which first and second alert devices are to be activated in response to the contingency. The GUI may also be configured to display at least one of the operational parameter and operational status of all alert devices coupled to the rules engine. Still further, it is contemplated that at least one of the alert devices is configured to provide upon activation by the rules engine a feedback signal to the operator, optionally via the GUI. Most preferably, the alert device in such feedback scenario is a computer configured to provide an alert screen to a person, and wherein the alert device is further configured to lock other applications on the computer until the person has provided the feedback signal.

Therefore, and viewed from another perspective, an integrated system for control of multiple subsystems comprising a GUI and an optionally redundant rules engine that is configured to control each of the subsystems, wherein each of the subsystems includes a device adapter that provides bi-directional flow of information between the rules engine and/or GUI and a channel adapter and/or an alert device coupled to the subsystem. In such systems, the information that flows from the at least one of the rules engine and the GUI to the channel adapter is selected from the group consisting of a query into operational capability, a query into operational status, and an alert command based on previously identified operational capability, while the information that flows from the channel adapter to at least one of the rules engine and the GUI is selected from the group consisting of operational capability information, operational status information, and a feedback signal in response to an alert command.

It is further preferred that in such systems the rules engine, the GUI, and the subsystems are configured to allow building of a rule using the GUI, and wherein the alert device and subsystem are configured such that GUI provides real-time information on at least one of operational capability and operational status of the alert device. Additionally, it is preferred that the rules engine, the GUI, and the subsystems are configured to allow activation of a multi-alert device alert using the GUI in response to (a) definition of an affected area and (b) definition of a contingency.

Consequently, in yet another aspect of the inventive subject matter, a method of operating an alert system includes a step of providing a GUI, a rules engine, a plurality of subsystems, and a plurality of alert devices, and coupling the GUI, the rules engine, the plurality of subsystems, and the plurality of alert devices to each other such that (a) the subsystems receive alert commands from at least one of the GUI and the rules engine and transfer the alert commands to the alert devices, and (b) the subsystems provide at least one of operational capability and operational status of the alert devices to at least one of the GUI and the rules engine. In another step, a rule is built for the rules engine using the GUI and information displayed on the GUI, wherein the displayed information is the at least one of the operational capability and operational status provided by the subsystem.

Preferred methods preferably include a step of selecting a contingency and defining an area of alert notification using the GUI, and activating a contingency responsive alert in the area using the GUI, wherein the contingency responsive alert employs at least two distinct alert devices, wherein defining the area of notification comprises selecting on the GUI an area using at least one of a Venn diagram, a geographic coordinate, a jurisdictional boundary, an area code, and a Zip code, wherein the GUI optionally displays at least one of a satellite image and a moving or three-dimensional object. Contemplated methods preferably further include a step of receiving feedback information from a person in response to activation of at least one of the two alert devices, and the subsystems are configured such that an alert device is activatable by at least two distinct subsystems.

Various objects, features, aspects and advantages of the present invention will become more apparent from the following detailed description of preferred embodiments of the invention.

BRIEF DESCRIPTION OF THE DRAWINGS

Prior Art FIG. 1A is a schematic illustration of an exemplary known alert system.

Prior Art FIG. 1A is a schematic illustration of failing cooperativity between exemplary known alert systems.

DETAILED DESCRIPTION

The inventor has discovered that an alert system can be configured and operated to allow single-click activation of multiple alert devices from a graphical user interface (GUI). In such systems and methods, each of the alert devices is coupled to the GUI and/or rules engine via a subsystem that typically includes a device adapter and a channel adapter, wherein the adapters are preferably configured to allow bidirectional flow of information between the alert devices, the device adapter, the channel adapter, the rules engine, and/or GUI. Contemplated alert systems are preferably driven by a rules engine that cooperates with the GUI to provide a rapid, emergency-specific, and geographically defined alert notification to a relevant population.

Figure 2A:
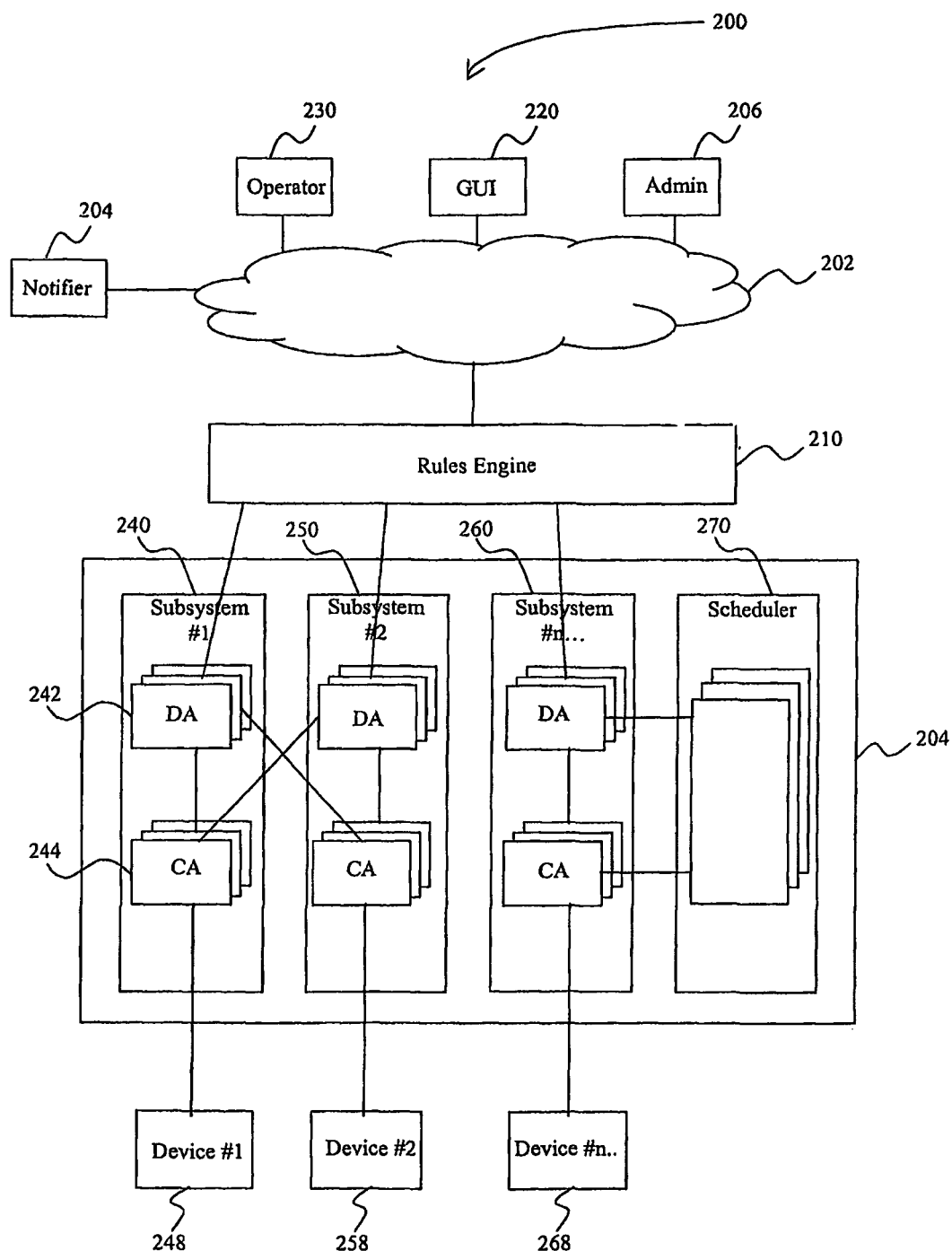
FIG. 2A is a schematic illustration of an exemplary integrated alert system according to the inventive subject matter.

In one preferred aspect of the inventive subject matter, the integrated alert system has a configuration as exemplarily depicted in FIG. 2A. Here, the alert system 200 includes a rules engine 210, typically run on one or more computers (e.g., server or otherwise networked CPU, preferably physically or logically configured as a single unit) that interface with one or more users via GUI 220 via a local or wide-area network 202. Most preferably, emergency notification is provided by a notifier 204 to the operator 230 via network 202. As in most known systems, the rules engine 210 can be modified by administrator 206. However, it should be especially noted that in contemplated systems 200 the flow of information is not unidirectional (i.e., from operator or administrator to device), but that the GUI and the rules engine can receive information from the subsystems and even from the devices as discussed below. With further reference to FIG. 2A, system 200 includes subsystems 240, 250, and 260, and scheduler 270 in an optional tower or rack 204, wherein each of the subsystems are coupled to the respective devices 248, 258, and 268. Each subsystem preferably includes a device adapter 242 and a channel adapter 244 (only enumerated for subsystem #1), wherein each of the device and channel adapters have multiple redundant copies (as hardware copies and/or software copies; shown in FIG. 2A as stacked rectangles).

In the example of FIG. 2A, it is especially preferred that the all communication paths between the devices and the rules engine are bidirectional. For example, the device adapter 242 of subsystem 240 may poll the channel adapter 244 to enquire what channels of activation are available and provide the polling results to the rules engine 210 and/or the GUI 220. In response to the request, channel adapter 244 may also optionally poll device 248 to identify the operational status and/or other device specific parameters (e.g., what types of signals may be provided to the public). The device reply is then relayed from the channel adapter 244 to the rules engine 210 via device adapter 242. Where two or more alert signals are to be provided using the same channel, scheduler 270 is included to coordinate channel sharing and/or to provide a suitable time sequence for these tasks. As with the device adapters and channel adapters, it should be noted that the scheduler is preferably redundant (in physical and/or virtual copies).

Thus, it should be particularly appreciated that the rules engine and GUI are dynamically updated on the status, availability, and/or capability of the downstream alert devices. Moreover, and viewed from another perspective, it should be recognized that the subsystems of the alert systems contemplated herein are configured to cooperate with a plurality of distinct alert devices and act as unifying and bidirectional communication bridge between the alert devices and the rules engine and GUI. Thus, any given set of alert devices can be controlled and activated using a single GUI by coupling the alert devices to the respective subsystems that then cooperate with the rules engine and GUI. Thus, as the rules engine and/or the GUI are informed of all available alert devices and their functionalities at all times, execution of rules for a contingency is dramatically simplified by defining an alert notification zone in which a predefined set of notifications should take place. The rules engine will then automatically, and in many instances simultaneously activate the downstream devices using available channels as appropriate. Still further, by providing a plurality of subsystems with relatively diverse sets of functionalities, multiple levels of redundancy can be achieved. Most significantly, by using contemplated subsystems, a first alert device (ordinarily activated by its first subsystem) can be activated using a second subsystem.

This is in significant contrast to heretofore known alert notification systems as shown in Prior Art FIG. 1A in which an administrator 100 is responsible to generate a response manual or handbook 102 in which emergency response scenarios are outlined for one or more operators (such manuals can be in printed format, or in an electronic version similar to a flow chart). Most typically, each time the emergency system is modified or updated, the administrator 100 must not only update the manual 102 to properly integrate the changes into the contingency responses, but also ascertain that each operator has the latest version available. In case of an emergency, the operator 110 will be notified by the appropriate sources and consults the manual 102 to identify the appropriate course of action depending on the type of emergency. In the example of FIG. 1A, the operator 110 then activates in sequence, and according to the manual 102, the first device 120A (e.g., siren) via interface 112A (e.g., siren controller), the second device 120B (e.g., pager) via interface 112B (e.g., dialer/text messenger controller), the third device 120C (e.g., highway display board) via interface 112C (e.g., board controller), and the fourth device 120D (e.g., TV alert) via interface 112D (e.g., TV alert controller).

With respect to contemplated GUIs it is generally preferred that the GUIs is a map-based interface, optionally with a satellite aerial view overlay. Furthermore, it is generally preferred that the GUI also provides pictograms or other identifiers of locations of relevant objects (e.g., location of plants, hospitals, sirens, fire stations, etc.) in the displayed map. There are numerous manners of displaying interactive maps known in the art, and all manners are deemed suitable for use herein. For example, contemplated maps may be two- or three-dimensional representations of a particular location, area, county, state, or country (most preferably to scale). Alternatively, or additionally, suitable maps also include more abstract maps, including those in which at least one of streets, rails, waterways, cities, geographical features, and political lines are illustrated in a schematic manner. It is still further preferred that such map-based GUIs allow zooming, panning, and/or jumping to a specific location (e.g., by entering a geographic coordinate, ZIP code, name of location, etc.). Moreover, and where desirable, contemplated map-based GUIs will provide multiple alternative views of the same location between which an operator can toggle, or which are at least partially overlaid on the same screen.

In especially preferred aspects of the inventive subject matter, the GUI also displays all alert devices located in the displayed area (e.g., as a siren symbol, highway display board, etc.) and further provides for each of the alert devices at least one of two on-screen options: First, the GUI displays operational status and/or all available commands for a particular alert device, wherein the data for status information and/or available commands are drawn directly (and most preferably automatically) from at least one of the alert device, the channel adapter, and the device adapter using the bidirectional features of the subsystem for the alert device. Second, the GUI is preferably also configured such that during rule making an administrator can select one or more of the available commands for a particular device to be executed for a specified contingency. Therefore, it should be appreciated that the GUI will greatly assist the administrator in the rule making process by having displaying the actual device capabilities from the devices installed in the field. Still further, if a device becomes inoperable, or is replaced with a device having not identical capabilities, the rules engine and/or GUI can notify the operator and/or administrator of a change in the operational status or capabilities and prompt for repair or updating of the rules engine.

Once the administrator has completed installation and/or updating of the rules in the rules engine, area-specific activation for predefined rules may be performed in numerous manners. For example, where an area is likely to be hit by a tornado, the operator may display that area on the GUI and define by point-and-click, click and drag, or other mouse or trackball based operation an area (e.g., circular rectangular, etc.) in which the appropriate alert devices are set off. In such an example, the operator may define the area by clicking on the potentially affected counties and then select from a predefined set of contingencies the option 'tornado warning'. Based on the rules that were established using device and channel information of the associated alert devices and other parameters, the appropriate devices are then activated in the selected areas using the GUI.

Alternatively, activation of alerts in a specific area may also be performed using Venn diagram-type operations (e.g., multiple areas selected with certain overlapping areas excluded and others defined with modified parameters), or be performed by entry of a ZIP code, telephone area code, city and/or county name, using any known input device (including voice recognition software). In still further preferred aspects, a geographic coordinate (e.g., identified by longitude and latitude), location name, or other identifier may be associated with an object, and most preferably a 3-dimensional object, to provide further detailed information. For example, the object at the particular coordinate may be a (multi-story) building, wherein the GUI provides a three-dimensional representation of that building having one or more significant items (e.g., remote-controllable components of the building, such as entry doors, ventilation systems, public announcement system, etc.). In such examples, the GUI may be programmed to display the building, factory, or other structure as an icon or other graphic representation (e.g., schematic using floor plan, or photographic), wherein the operator may select detail views (e.g., to focus on a particular floor level of a building, or particular device within the building and/or floor). Thus, it should be recognized that single objects at a coordinate may be expanded to display multiple aspects and/or devices, wherein such devices are preferably coupled to the GUI via a subsystem as discussed above. Therefore, such devices may also be remotely controllable via the GUI. Among other example, devices in a building controllable using the systems contemplated herein include air intake vents, access controlled doors, audible/visual alarm systems, display boards/screens, etc. Still further contemplated objects displayed on the GUI may be mobile. Among other suitable choices, such objects include school buses, mobile hospitals, etc, wherein such mobile objects may have one or more remotely activated devices (e.g., messaging system, ignition interrupt, etc.). Typically, activation follows a rule from the rules engine. Furthermore, in such mobile devices, it is generally preferred that the mobile device provides positional information to the GUI.

Consequently, it should be noted that the GUI can be used to program the rules engine using information provided by the subsystem (device adapter and/or channel adapter) and that the GUI is also used to (a) define an alert area (b) selected from a predefined set of emergencies the applicable choice, and (c) trigger the appropriate alert devices in the defined area. In yet further contemplated aspects, the user input on the GUI may also be bypassed by installation of an I/O controller that directly interacts with the rules engine (see below). Such user independent input is typically optional and available as an additional and alternate manner of providing an alert.

Once a desired region for an alert notification and the suitable action for the selected region been defined using operator input via the GUI, the rules engine will preferably identify available subsystems, their operational capability and status, and optionally display and/or highlight those subsystems on the GUI. Depending on the particular contingency and predefined rules (also known as recipes), the rules engine will typically request a confirmation from the operator to activate simultaneously (or in a predetermined sequence) and automatically multiple appropriate subsystems. It should be noted that such an integrated system will greatly facilitate proper and expeditious operation of the alert system as the user only has to define the area to be alerted and to specify the type of contingency.

It is generally preferred that the rules engine is configured as a single logical unit and closely cooperates with the GUI to display area-specific information, alert device specific information, and contingency specific information. However, in alternative aspects of the inventive subject matter, the rules engine may also be located and/or executed on separate computers, which may be physically or logically distinct units. Furthermore, it should be noted that more than one operator may interact via more than one GUI with the rules engine. For example, different departments (e.g., fire, police, homeland security) may use the same GUI in distinct locations and may be logically coupled to the same rules engine. Thus, contemplated rules engines may be physically present as one or more computers, which may operate independently, or interconnected using networks well known in the art.

The rules engine is preferably software based and configured by an administrator via the GUI. In a typical operation, the rules engine will poll all available subsystems (and optionally even alert devices) to collect positional and/or operational information of the associated alert devices, and relate at least some of the information to the GUI. The GUI will then present the alert devices in the respective positions on the map or other graphical representation. The administrator can then define recipes based on likely or anticipated contingencies using the alert device capabilities presented on the GUI. Once the rules are defined, activation of suitable alerts in response to a contingency only require an operator to specify the contingency and the area to be alerted. Thus, it should be appreciated that the integrated system not only provides a simple and efficient mode of rule building, but also provides a simplified mode of activation of numerous alert devices in a single activation device (GUI), even if multiple channels or channel conflicts are present. Moreover, contemplated systems also provide for manners of activation of alert devices that transcend boundaries ordinarily set by jurisdictions, departments, or other predefined structures of authority or command. Therefore, the rules engine will most typically receive commands for alert notification from the GUI and pass the appropriate alerts then to the alert devices via the device/channel adapters.

However, in further aspects of the inventive subject matter, the rules engine can also receive one or more commands from an I/O device that is preferably coupled to the rules engine via a subsystem having at least one of a device adapter and a channel adapter. Such configuration will advantageously provide a fully automated operation in which a plurality of alerts using a plurality of channels can be triggered in a user independent manner (i.e., no need for an operator to define type of emergency and area of notification) in a predetermined fashion. In such configurations, an alert device is replaced with an I/O (Input/Output) module to allow the rules engine to receive an input from an external device. While all known external devices are deemed suitable, especially preferred external devices include PLCs (programmable logic controllers), sensors reactive to a chemical, microbial, or radiological stimulus, and alert radios (e.g., those receiving a NOAA weather alert). In such systems, the rules engine can be programmed to activate an alert sequence that has been pre-established upon a response received from the input channel rather than from an operator.

For example, actions could be set up that would call selected responders in an emergency via a telephone device/channel adapter, set off certain sirens via a siren device/channel adapter, and trigger computer emergency messaging (e.g., using NOTIFIER™, commercially available from CENTRALERT™ Corp., Kennewick, Wash.) that could provide appropriate messages to selected computers on a network. This action could be automatically activated by an I/O module that is either directly coupled to the rules engine, or that is coupled to the rules engine via a subsystem in the same way as an alert device. For example, if NOAA issues a tornado warning, an alert radio coupled to the I/O module would receive the NOAA signal and close a contact in the I/O module, which in turn is coupled to the rules engine to thereby initiate the above action.

In still further preferred aspects, the rules engine is also configured to cooperate with the subsystems to provide increased redundancy using the bidirectional flow of information across the subsystems. For example, where the device adapter of a first subsystem is non-functional, the rules engine can detect such non-function and activate a device adapter of a second subsystem. The device adapter (or redundant copy thereof) of the second subsystem is then instructed by the rules engine to provide the activation signal to the channel adapter of the first subsystem for activation of the alert device coupled to the first subsystem.

With respect to the subsystems, it is generally preferred that each subsystem comprises a device adapter and a channel adapter that control the operation of an alert device. Most typically, the device adapter and the channel adapter are electronically coupled to the computer(s) running the rules engine via the device adapter, while the alert device is coupled to the channel adapter. There are numerous manners of electronically coupling computer devices known in the art, and all known manners are deemed suitable for use herein. For example, coupling of the device adapter to the computer running the rules engine may be performed using Ethernet connectivity, Internet connectivity, wireless connectivity (e.g., Bluetooth, cellular, radio, satellite, etc.) using well known protocols, and all reasonable combinations thereof. Similarly, the alert devices can be coupled to the channel adapters using all manners known in the art. For example, a telephony, paging, and/or fax system (optionally interactive) can be coupled to the subsystem via a phone jack (and dialer acting as the channel adapter), while a highway display board system may be coupled to the subsystem via wireless connectivity. In further contemplated aspects, it should be noted that at least one component of the subsystem may also be a virtual component that is simulated by software executed on a distinct computer and/or the computer that also runs the rules engine and/or GUI.

Thus, and viewed from one perspective, a device adapter may be viewed as an electronic representation or replica of the actual alert device, wherein the device adapter is configured to electronically communicate with the rules engine, and wherein the device adapter provides information of the operational capabilities and/or status to the rules engine/GUI. Communication is preferably done via standard interface technology and may therefore include USB ports, parallel and/or serial ports, Bluetooth connectivity, etc. Therefore, and viewed from another perspective, contemplated device adapters are not merely passive devices that receive electronic commands from the rules engine, but are interactive devices that provide the rules engine (preferably upon query) with information on status and/or capabilities of the downstream installed alert device. Moreover, in still further preferred aspects, the device adapter will also have querying capabilities to determine the operational status of the associated channel adapter and downstream alert device, which the device adapter will then relay to the rules engine. In addition, it is contemplated that failure of communication to and/or from a device adapter may trigger operation of the device adapter in fail safe mode.

Device adapters may be configured in numerous manners, and all known manners are contemplated suitable for use herein. For example, where suitable, device adapters may be program modules that simulate the downstream alert device. Such virtual adapters may be run on a separate computer, or on the same computer on which the rules engine runs. Alternatively, the device adapter may also be a hardware device that is electronically coupled to the rules engine. Such hardware devices may be plug-and-play cards that are installed on the computer that executes the rules engine, or may be devices installed or operating independently of the computer that executes the rules engine. In still further particularly preferred aspects of device adapters contemplated herein, the device adapter may be configured as a multiple redundant device with redundant copies at the same locale, and/or with at least one redundant copy in a remote position (exemplary redundant systems are described in U.S. provisional application with the Ser. No. 60/522,865, now abandoned, which was filed Nov. 15, 2004, and which is incorporated by reference herein).

Moreover, preferred device adapters will be configured to not only provide redundancy within a single subsystem, but also to provide functional capabilities of a second device adapter that is functionally associated with a second, distinct subsystem. For example, a device adapter for a pager notification alert subsystem may also include functionalities of a device adapter for a fax notification subsystem, and/or a telephonic notification subsystem. Therefore, vertical as well as horizontal redundancy is realized. Consequently, it should be appreciated that one device adapter may be electronically coupled to at least two channel adapters. Such cross coupling may be done via cable connectivity as well as logical connectivity (e.g., where multiple device adapters of multiple subsystems are run in a single computer) and is schematically illustrated in FIG. 2A as lines crossing between subsystems 1 and 2, optionally using different copies of the redundant device adapters.

With respect to contemplated channel adapters, it should be recognized that the channel adapter will preferably be coupled between the device adapter and an alert device. Particularly preferred channel adapters will therefore translate signals received from the device adapter (and with that signals from the rules engine) into signals that will drive directly or indirectly the actual alert device using pathways suitable for the alert device. For example, suitable channel adapters include telephone dialers, radio transmitters, optical network components, simple wiring, etc. There are numerous such devices known in the art, and all of those are deemed suitable for use in conjunction with the teachings presented herein. However, and in contrast to currently known alert systems that are passive systems in which commands flow only from the rules engine to the alert device, contemplated channel adapters will be configured to provide bi-directional flow of information between the channel adapter and the device adapter/rules engine and between the channel adapter and the alert device.

Similar to the redundancy for the device adapter discussed above, it is generally preferred that the channel adapter is configured to provide multiple levels of redundancy. Among other things, suitable channel adapters may include multiple copies (e.g., physical and/or virtual, collocated or in different locations). Alternatively, or additionally, contemplated channel adapters for one subsystem (e.g., pager subsystem) may also provide functionalities for another subsystem (e.g., public siren subsystem). Therefore, redundancy is achieved not only within components of one subsystem, but also among multiple components across multiple subsystems. Subsystems, device adapters, and/or channel adapters may be located in a single device, multiple directly connected devices, or in a plurality of independent devices that may be networked using network protocols well known in the art. Furthermore, the subsystems and/or devices are preferably, but not necessarily, logically separated. While it is generally preferred that the channel adapter will be a separate device and/or program, integrated functionality between device adapter and channel adapter into a single program, board, and/or device are also contemplated. Furthermore, the device adapter and/or the channel adapter are configured as plug-and-play modules such that a user can add, modify, or remove a device with only minimal technical knowledge.

Thus, and especially where contemplated rules engines are standard in a jurisdiction, it is contemplated that the subsystem, device adapter, and/or channel adapter may be offered not only by the providers of the alert system, but also by the providers of alert devices to allow the alert device manufacturer to have seamless integration into a standardized system. Consequently, it should be noted that contemplated alert systems provide a platform for unification of diverse alert devices and communities in which existing devices are maintained and integrated into the alert system using the device adapter/channel adapter. Moreover, such integration advantageously also allows simplification and streamlining of configuration of the rules engine by using bidirectional flow of information. Consequently, and as already discussed above, the rules engine will preferably include a functionality that allows bi-directional communication between the rules engine and downstream components of one or more subsystems to identify operational functions, operational status, and/or availability for an alert device.

Preferably, the rules engine will be programmed such that the operator/administrator can configure an emergency response in a flexible manner in which the capabilities of the alert devices are made available to the operator/administrator without actual knowledge of the device in the field. In most instances, the rules engine will query the device adapter, which will provide device-specific information (available functionality, operational status, etc.) to the rules engine. Such feedback may also involve querying of the channel adapter and/or the alert device. Among other advantages, it should be especially recognized that contemplated integrated alert systems not only allow an operator initiate a comprehensive and preprogrammed multi-device alert with a single click on a single system, but also enable an operator/administrator to adaptively program a rules engine with capabilities that are actually present in the field. Still further, contemplated bi-directional communication capabilities may also be employed for periodic operational checks of the system, which may alert the system operator of malfunctions, intrusions, or other remote events.

Additionally, or alternatively, the rules engine and/or subsystem may be configured in a manner that allows receipt of confirmation of receipt of a notification by an alert device. Such confirmation is particularly advantageous where the alert device includes a telephone system, a pager system, a text messaging system, and/or a Internet based alert system. Among other benefits, an operator may readily assess the emergency response force available for a particular incident and initiate subsequent alerts or de-escalating notifications. For example, an instant messaging system may be provided in which a first responder is notified by a pop-up message that will disable other use of the responders computer until acknowledgement has been sent to the rules engine or other component/operator in contemplated systems. Thus, an authorized user may not only notify another user, a group, or area of users and but also receive feedback from the notified parties. Communication may be facilitated among users/responders separate from general broadcast, chat, or instant message.

With respect to contemplated alert devices it should be appreciated that all known alert devices are deemed suitable for use herein, including personal alert devices, group alert devices, and public alert devices. For example, contemplated public alert devices include highway billboards, sirens, tone alert radios, and public announcement speakers, while suitable group alert devices include emergency pagers, cell phones, etc. Contemplated personal alert devices include TV sets, radios, telephone, and walkie-talkies. However, and as already discussed above, the alert system according to the inventive subject matter can also be used to remotely control operation of control devices that are coupled to the rules engine/GUI via an appropriate subsystem. For example, such control devices include access control devices, ventilation components, electronic control circuits of vehicles, etc.

Figure 2B:
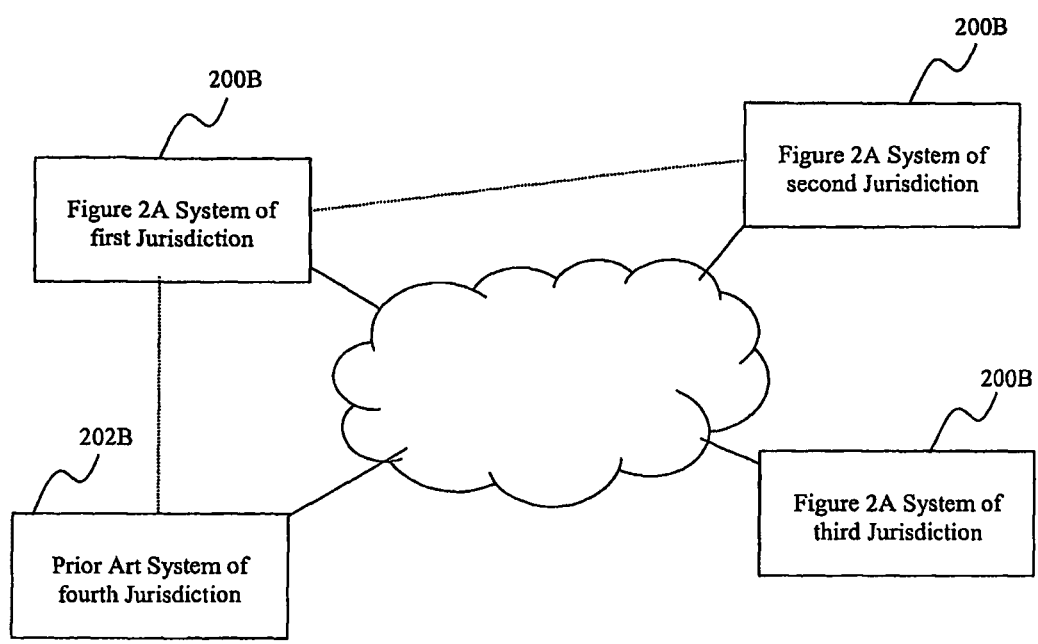
FIG. 2B is a schematic illustration of cooperativity of various exemplary integrated alert systems and prior art systems according to the inventive subject matter.

Additionally, it should be appreciated that two or more systems according to the inventive subject matter may informationally coupled to each other as exemplarily depicted in FIG. 2B. Here, alert systems 200B (corresponding to the system 200 as depicted in FIG. 2A) of three jurisdictions are informationally coupled to each other via a wide area network (e.g., fiber optic network on Internet) and have subscribed to event-based notifications (e.g., earthquake or tsunami notification among three counties). As with the system 200 of FIG. 2A above, notification can be provided by automated sensors (e.g., seismic, chemical, biological), operator input from emergency response departments (e.g., police or fire), and/or from commercial notifiers. It should be recognized that in such systems notification can be relayed among all subscribing parties and automated notifications advantageously may trigger downstream notifications in each of the subscribing parties in an automated manner. Moreover, and depending on the particular configurations, even heretofore known alert systems (202B) may be at least partially included in the subscription system as also depicted in FIG. 2B.

Thus, specific embodiments and applications of integrated alert systems have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:
1. A dynamic control system for automated emergency response, comprising:
    a rules database comprising distinct first and second pre-established rule sets representing first and second emergency action plans, respectively, wherein each of the first and second rule sets comprises a set of conditions and a set of actions to take if the set of conditions are met;

a rules engine informationally coupled to the rules database, a plurality of inputs, and a plurality of outputs, such that the rules engine is configured to dynamically link one to many of the inputs with one to many of the outputs based on a selected rule set;

wherein the plurality of inputs comprises first and second inputs and the plurality of outputs comprises first and second outputs, and wherein the first input is configured to receive a first alert of a first type, and wherein the second input is configured to receive a second alert of a second type, and wherein the first and second types are different;

wherein the rules engine is configured to (1) analyze one or more received alerts via the first or second inputs, (2) select one of the first and second pre-established rule sets based on whether the set of conditions for the rule set is met, and (3) as a function of the set of actions of the selected rule set, automatically transmit first and second commands to first and second stationary devices via the first and second outputs, respectively, wherein the first and second stationary devices are logically distinct and remote from one another;

a control device separates from the first and second stationary devices and comprising a graphical user interface (GUI), wherein the control device is informationally coupled to the rules engine; and wherein the GUI is further configured to allow for operator input of a contingency by selecting a geographic alert area using the GUI, wherein the geographic alert area comprises an area in which the first and second stationary devices are to be activated in response to the contingency, and wherein the GUI is configured to display an operational parameter of all alert devices coupled to the rules engine, and wherein the GUI is configured to allow for building of a rule set using the displayed operational parameter.

2. The system of claim 1, wherein the rules engine is further configured to automatically transmit a third command to a third device as a function of the set of actions of the selected rule set, and wherein the third device comprises an audible notification system, wherein the second stationary device comprises a messaging system configured to transmit messages to a plurality of user devices, and wherein the first stationary device comprises a stationary device.

3. The system of claim 2, wherein at least one of the first and second alerts include information about an emergency in an affected area, and wherein the rules engine transmits (1) the third command to the third device to cause an audible notification to the affected area, (2) the second command to the second stationary device to cause a message to be sent to a plurality of people associated with the affected area, and (3) the first command to the first stationary device to cause the first stationary device to take a specified action.

4. The system of claim 3, wherein the first stationary device comprises air intake vents, and wherein the first command results in closure of the air intake vents.

5. The system of claim 3, wherein the first stationary device comprises access controlled doors, and wherein the first command remotely controls the doors.

6. The system of claim 3, wherein the second stationary device comprises a messaging system configured to send messages to a plurality of cell phones associated with the plurality of people.

7. The system of claim 3, wherein the second stationary device is selected from the group consisting of a visual alarm system, an audio alarm system, a display screen, a telephone system, a pager system, a text messaging system, an Internet based alert system, a highway billboard, a siren, a tone alert radio, and a public announcement speaker.

8. The system of claim 3, wherein the third device comprises a siren.

9. The system of claim 1, wherein the GUI is further configured to allow the operator to select an area of a structure as the geographic alert area and a type of emergency.

10. The system of claim 1, wherein the control device is a computer configured to provide an alert screen to an operator, and wherein the control device is further configured to lock other applications on the computer until the operator has provided a requested feedback.

11. The system of claim 1, wherein the GUI is further configured to allow for the operator to select on the GUI the geographic alert area using at least one of a Venn diagram, a geographic coordinate, a jurisdictional boundary, an area code, and a Zip code, wherein the GUI optionally displays at least one of a satellite image and a moving or three-dimensional object.

12. The system of claim 1, wherein the plurality of inputs further comprises third and fourth inputs, and wherein the third input is configured to receive a third alert of a third type, and wherein the fourth input is configured to receive a fourth alert of a fourth type, and wherein the third and fourth types are different, and wherein the rules engine is further configured to analyze the third and fourth alerts, and (3) as a function of the set of actions of the selected rule set, automatically transmit third and fourth commands to third and fourth stationary devices.

13. The system of claim 12, wherein the first stationary device and third stationary device are the same.

14. The system of claim 1, further comprising a scheduler that is configured to schedule issuance of the first and second commands to the first and second stationary devices.

15. The system of claim 1, wherein the first and second stationary devices are selected from the group of air intake vents, access controlled doors, an access control device, and an ignition interrupt device.

* * * * *